US012573323B2

(12) United States Patent
Yamada

(10) Patent No.: US 12,573,323 B2
(45) Date of Patent: Mar. 10, 2026

(54) DISPLAY DEVICE

(71) Applicant: Sharp Display Technology Corporation, Kameyama City (JP)

(72) Inventor: Junichi Yamada, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 154 days.

(21) Appl. No.: 18/289,058

(22) PCT Filed: Jun. 9, 2021

(86) PCT No.: PCT/JP2021/021906
§ 371 (c)(1),
(2) Date: Oct. 31, 2023

(87) PCT Pub. No.: WO2022/259416
PCT Pub. Date: Dec. 15, 2022

(65) Prior Publication Data
US 2024/0221552 A1 Jul. 4, 2024

(51) Int. Cl.
*G09G 3/00* (2006.01)
*G02F 1/1362* (2006.01)
*G02F 1/1368* (2006.01)

(52) U.S. Cl.
CPC ....... *G09G 3/006* (2013.01); *G02F 1/136204* (2013.01); *G02F 1/136286* (2013.01); *G02F 1/1368* (2013.01); *G09G 2330/06* (2013.01); *G09G 2330/12* (2013.01)

(58) Field of Classification Search
CPC .............. G09G 3/006; G09G 2330/06; G09G 2330/12; G02F 1/136204; G02F 1/136286; G02F 1/1368; G09F 9/00; G09F 9/30; G09F 9/302
See application file for complete search history.

(56) References Cited

U.S. PATENT DOCUMENTS

| | | | | |
|---|---|---|---|---|
| 2009/0243641 A1* | 10/2009 | Noumi | ................ | G02F 1/13452 |
| | | | | 324/750.01 |
| 2011/0234957 A1* | 9/2011 | Watanabe | ............. | G02F 1/1345 |
| | | | | 349/139 |
| 2014/0217412 A1* | 8/2014 | Yanagisawa | .......... | G02F 1/1309 |
| | | | | 257/66 |

FOREIGN PATENT DOCUMENTS

| | | |
|---|---|---|
| JP | 2003-084304 A | 3/2003 |
| JP | 2009-237280 A | 10/2009 |
| JP | 2011-070104 A | 4/2011 |
| JP | 2014-153493 A | 8/2014 |

* cited by examiner

*Primary Examiner* — Akm Zakaria
(74) *Attorney, Agent, or Firm* — ScienBiziP, P.C.

(57) ABSTRACT

A display device (1) includes a semiconductor chip (2) and a video protection circuit (3) mounted in a frame region (8) of a display panel (6), the display panel (6) includes a plurality of panel terminals (14R, 14G, and 14B) arranged in accordance with a staggered arrangement, and the video protection circuit (3) includes a plurality of diode connection protection circuits (15R, 15G, and 15B) arranged in accordance with a staggered arrangement to correspond to the plurality of panel terminals (14R, 14G, and 14B), respectively.

6 Claims, 12 Drawing Sheets

DISPLAY DEVICE

TECHNICAL FIELD

The disclosure relates to a display device including a semiconductor chip mounted in a frame region disposed around a display region of a display panel in order to supply a video signal to a plurality of pixels disposed in the display region of the display panel.

BACKGROUND ART

There is known a liquid crystal display device including switching elements including thin film transistors arranged in a matrix on an insulating substrate, and a first power source line and a second power source line provided outside a display region, in which a first diode and a second diode are connected on a signal wiring line for connecting an output terminal of a drive IC and a drive circuit integrally formed with the switching elements to each other. the first diode is disposed between the first power source line and the signal wiring line and is connected to the signal wiring line so that the first diode is reversely biased, and the second diode is disposed between the second power source line and the signal wiring line and is connected to the signal wiring line so that the second diode is reversely biased (PTL 1).

This configuration solves the problem that static electricity generated in a COG mounting process of the liquid crystal display device adversely effects a part of the drive circuit which has already been formed.

CITATION LIST

Patent Literature

PTL 1: JP 2003-84304 A

SUMMARY

Technical Problem

In an organic light emitting diode (OLED) panel, when a semiconductor chip is mounted on a panel (chip on plastic (COP)), a circuit may be disposed under the COP in order to narrow a frame on the panel terminal side. Particularly suitable is a circuit, such as video protection circuit and a panel inspection circuit, in which one circuit is required to be disposed for each video signal line.

However, in such a case, there is a tendency that a distance between a panel terminal formed on the display panel in order to be bonded to the semiconductor chip and the circuit becomes short, and there is concern that a transistor in the circuit may be adversely affected in a case where static electricity enters from the panel terminal before the semiconductor chip is mounted.

An object of one aspect of the disclosure is to provide a display device in which a circuit disposed under a semiconductor chip can be protected from static electricity entering through a panel terminal before the semiconductor chip is mounted.

Solution to Problem

In order to solve the above-described problem, a display device according to one aspect of the disclosure includes a semiconductor chip mounted in a frame region disposed around a display region of a display panel to supply a video signal to a plurality of pixels disposed in the display region of the display panel, and a peripheral circuit formed in the frame region to protect or inspect the plurality of pixels in the display region before the semiconductor chip is mounted in the frame region, in which the display panel includes a plurality of panel terminals to which a plurality of output terminals of the semiconductor chip are bonded, respectively, the plurality of panel terminals are arranged in accordance with a staggered arrangement in which the plurality of panel terminals are arranged in directions oblique to each other, and the peripheral circuit includes a plurality of peripheral circuit elements arranged in accordance with the staggered arrangement to correspond to the plurality of panel terminals, respectively.

Advantageous Effects of Disclosure

According to one aspect of the disclosure, a circuit disposed under a semiconductor chip can be protected from static electricity entering through a panel terminal before the semiconductor chip is mounted.

DESCRIPTION OF EMBODIMENTS

First Embodiment

Figure 1:
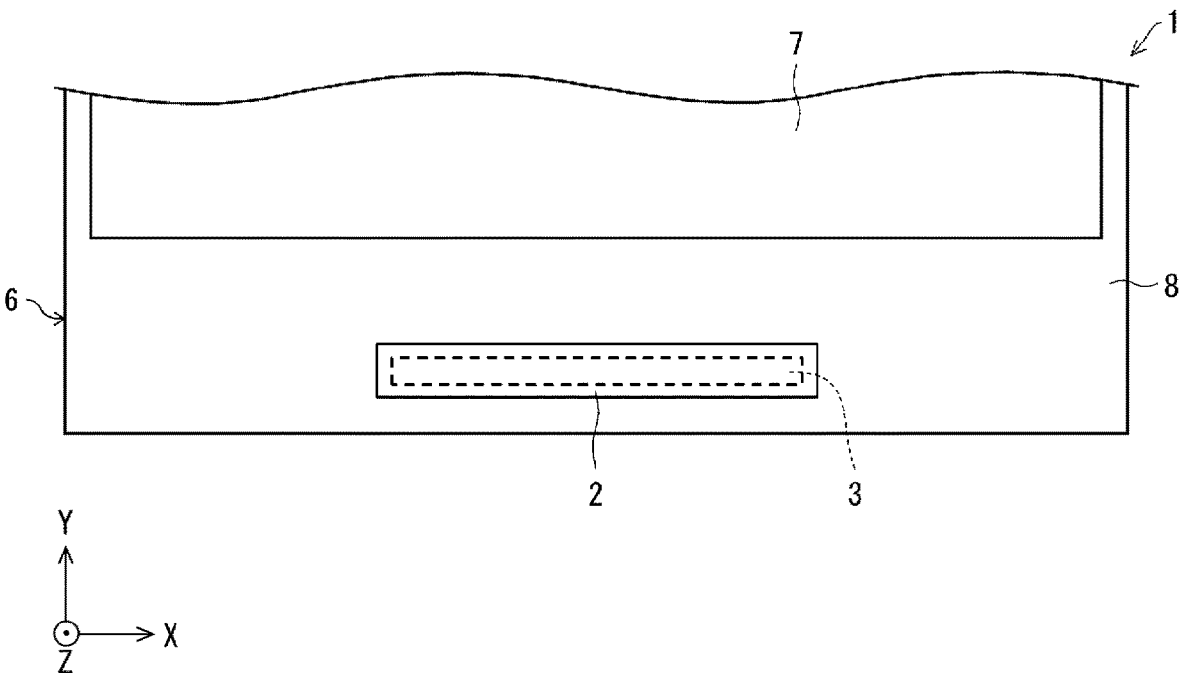
FIG. 1 is a plan view of a main part of a display device according to a first embodiment.
Figure 2:
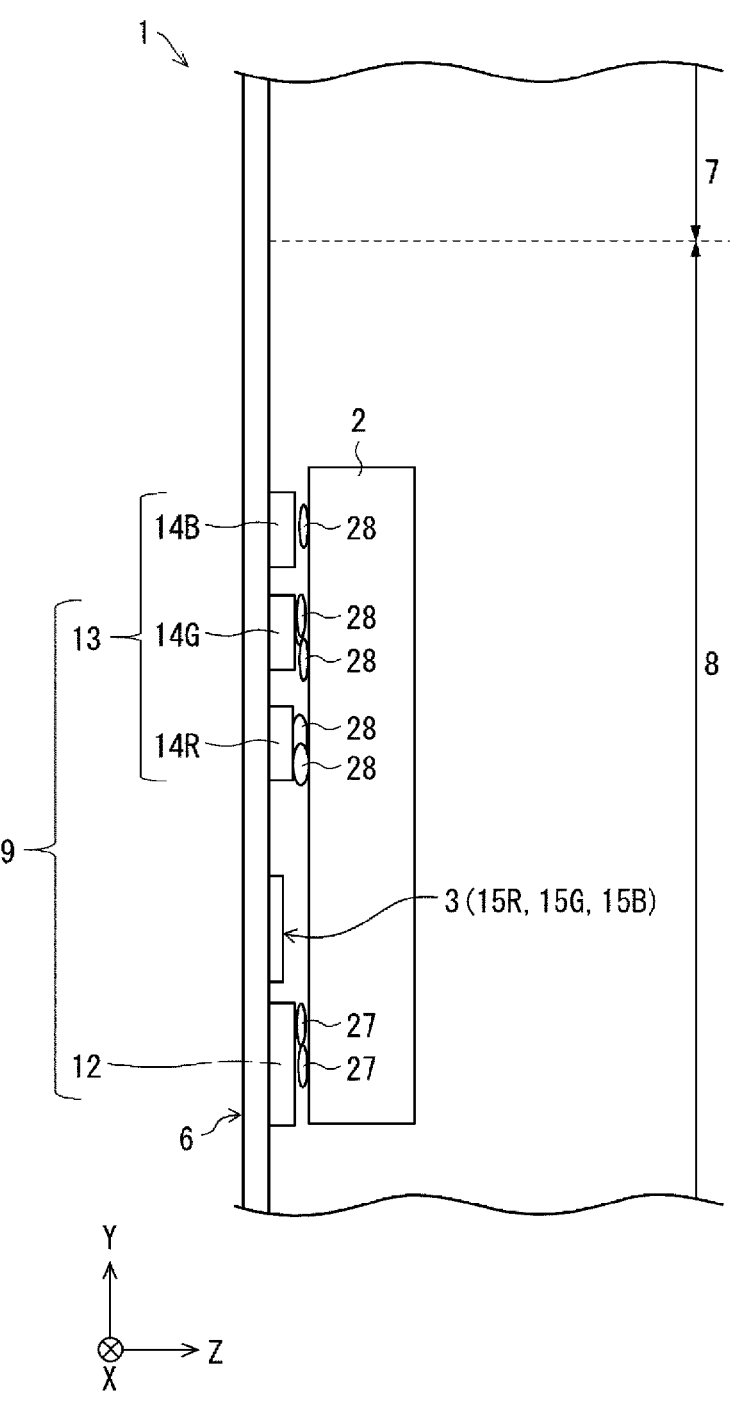
FIG. 2 is a cross-sectional view of the display device.
Figure 3:
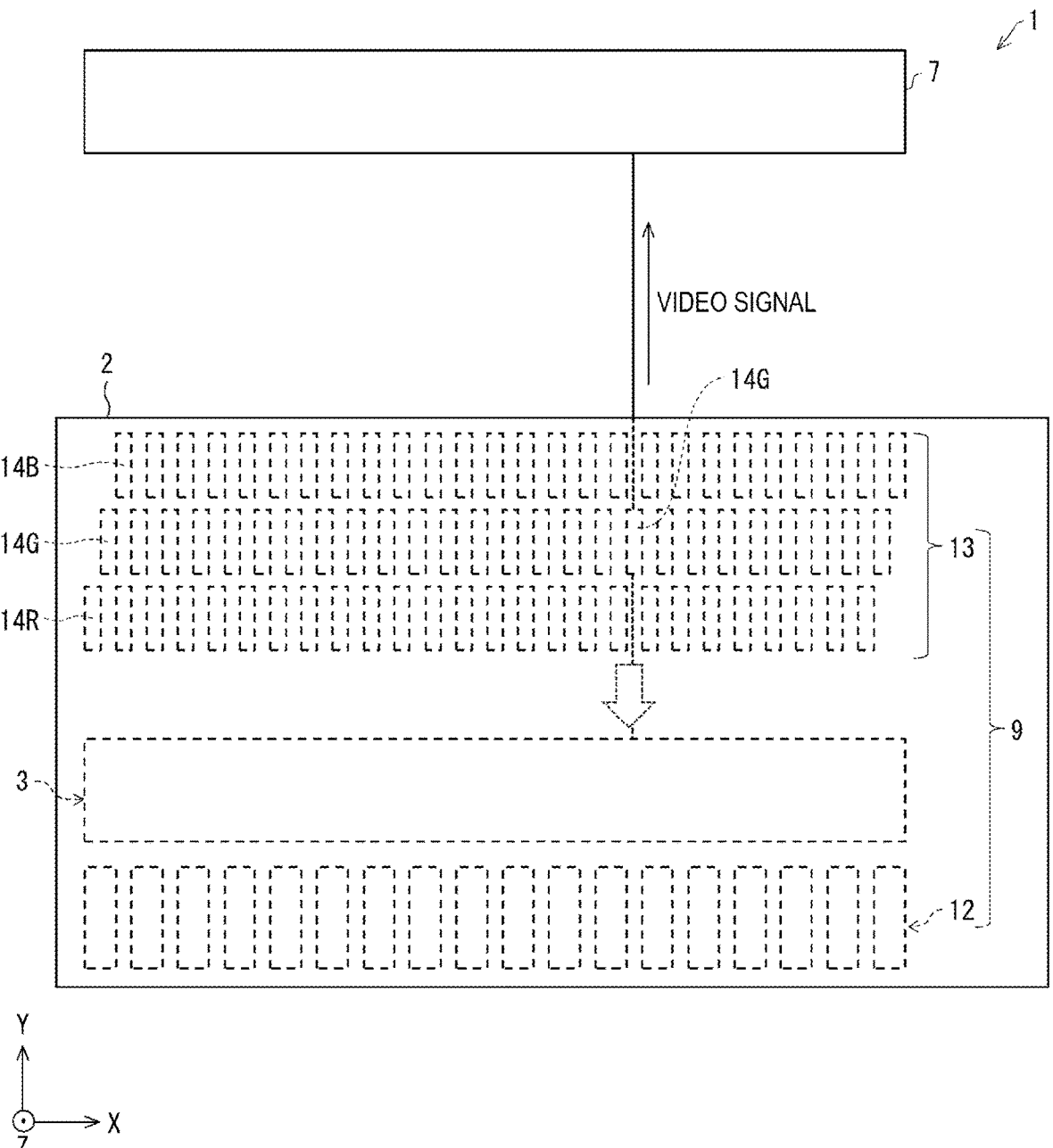
FIG. 3 is a schematic view illustrating an arrangement relationship among pixels, a panel terminal portion, and a video protection circuit provided in the display device.
Figure 4:
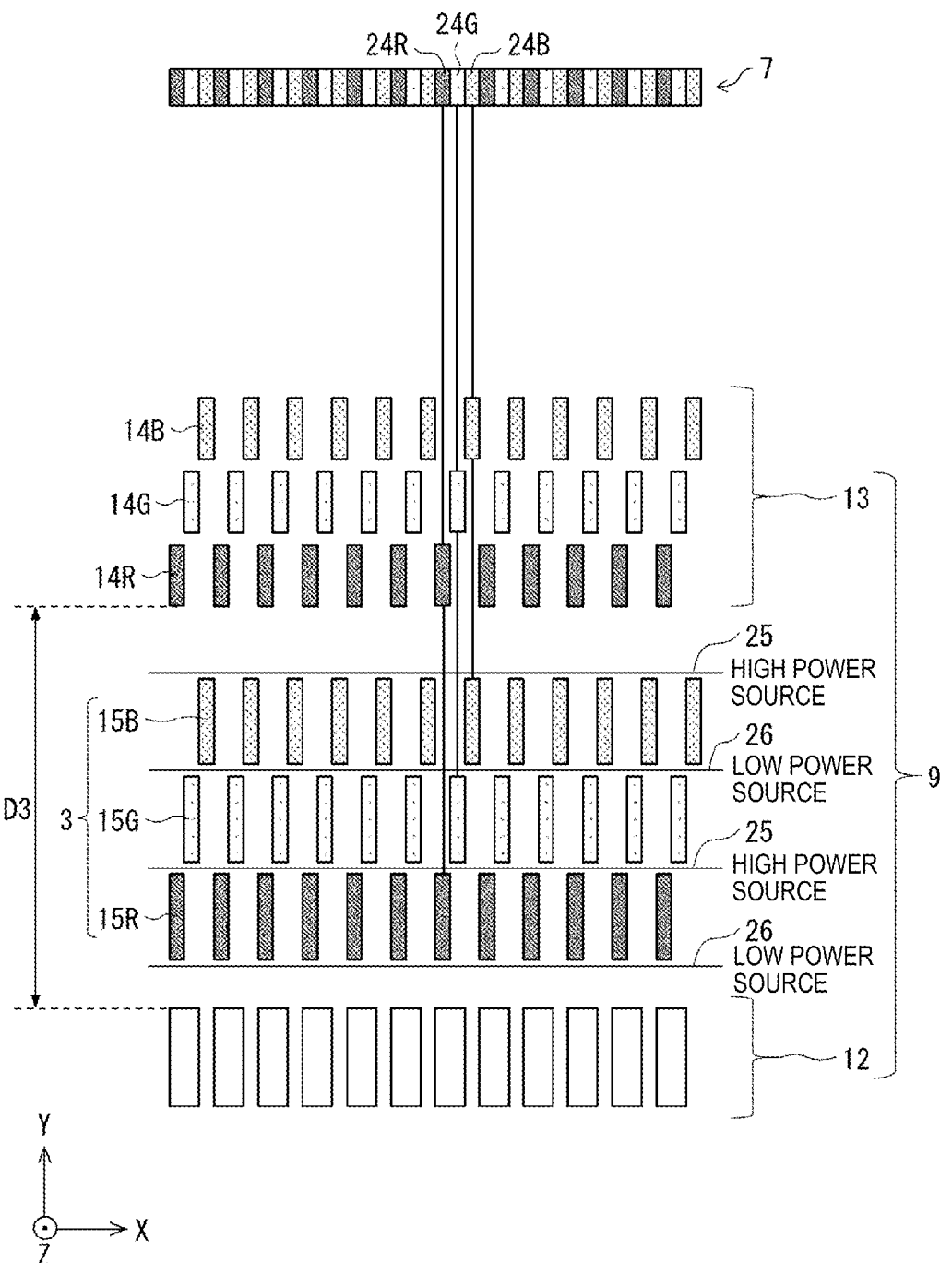
FIG. 4 is a schematic view illustrating a configuration of a diode connection protection circuit provided in the video protection circuit.
Figure 5:
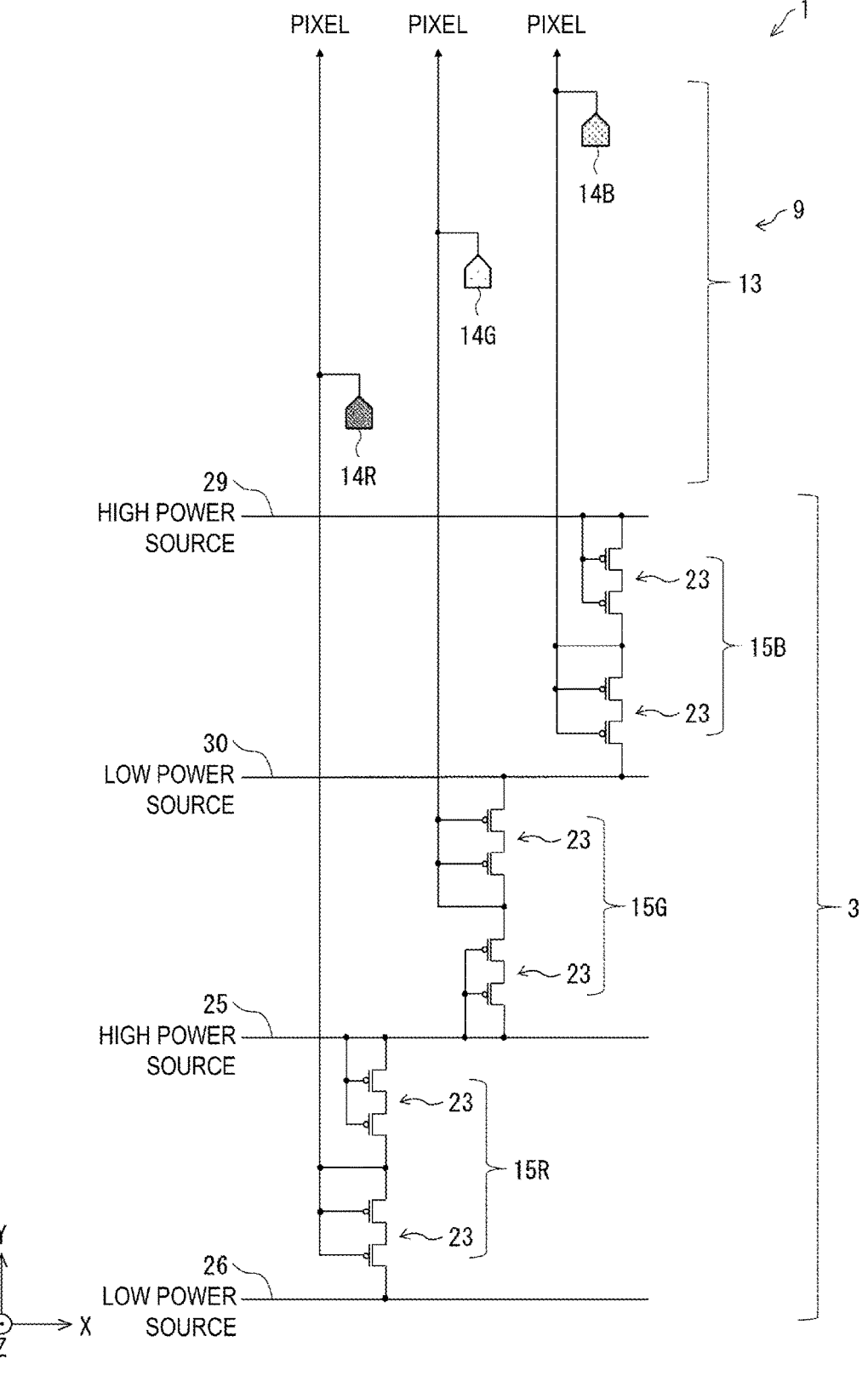
FIG. 5 is a schematic view illustrating an arrangement relationship between the panel terminal portion and the diode connection protection circuit provided in the display device.

FIG. 1 is a plan view of a main part of a display device 1 according to a first embodiment. FIG. 2 is a cross-sectional view of the display device 1. FIG. 3 is a schematic view illustrating an arrangement relationship among pixels, a panel terminal portion 9, and a video protection circuit 3 provided in the display device 1. FIG. 4 is a schematic view illustrating a configuration of diode connection protection circuits 15R, 15G, and 15B provided in the video protection circuit 3. FIG. 5 is a schematic view illustrating an arrangement relationship between the panel terminal portion 9 and the diode connection protection circuits 15R, 15G, and 15B provided in the display device 1.

The display device 1 includes a semiconductor chip 2 mounted in a frame region 8 disposed around a display region 7 of a display panel 6 in order to supply a video signal to a plurality of pixels disposed in the display region 7, and a video protection circuit 3 (peripheral circuit) formed in the frame region 8 in order to protect the plurality of pixels in the display region 7 before the semiconductor chip 2 is mounted in the frame region 8.

The semiconductor chip 2 includes, on a lower surface facing the display panel 6, a plurality of input terminals 27 formed on the opposite side of the display region 7 and a plurality of output terminals 28 formed on the display region 7 side. The display panel 6 includes the panel terminal portion 9 to which the plurality of input terminals 27 and the plurality of output terminals 28 of the semiconductor chip 2 are bonded.

The panel terminal portion 9 includes an input terminal portion 12 for supplying an input signal to the plurality of input terminals 27 of the semiconductor chip 2 and an output terminal portion 13 for receiving a video signal output from the plurality of the output terminals 28 of the semiconductor chip 2. The video protection circuit 3 is disposed between the input terminal portion 12 and the output terminal portion 13.

The output terminal portion 13 includes a plurality of panel terminals 14R each arranged along the X direction in order to receive a video signal corresponding to a pixel emitting red light from the semiconductor chip 2, a plurality of panel terminals 14G each arranged along the X direction in order to receive a video signal corresponding to a pixel emitting green light, and a plurality of panel terminals 14B each arranged along the X direction in order to receive a video signal corresponding to a pixel emitting blue light. The plurality of panel terminals 14R, the plurality of panel terminals 14G, and the plurality of panel terminals 14B are arranged in accordance with a staggered arrangement in which the plurality of panel terminals are arranged in directions oblique to each other.

The video protection circuit 3 is provided so as to protect the plurality of pixels in the display region 7 and a pixel circuit for controlling the plurality of pixels from static electricity entering through the plurality of panel terminals 14R, the plurality of panel terminals 14G, or the plurality of panel terminals 14B.

As illustrated in FIG. 4, the video protection circuit 3 includes a plurality of diode connection protection circuits 15R, 15G, and 15B (video protection circuits, peripheral circuits) corresponding to the plurality of panel terminals 14R, 14G, and 14B, respectively. The plurality of diode connection protection circuits 15R (video protection circuits, peripheral circuits) are arranged along the X direction, the plurality of diode connection protection circuits 15G (video protection circuits, peripheral circuits) are arranged along the X direction, and the plurality of diode connection protection circuits 15B (video protection circuits, peripheral circuits) are arranged along the X direction. The plurality of diode connection protection circuits 15R, 15G, and 15B are arranged in three stages in accordance with the staggered arrangement so as to correspond to the plurality of panel terminals 14R, 14G, and 14B, respectively.

Each of the plurality of pixels disposed in the display region 7 includes a first subpixel 24R for emitting red (first luminescent color) light, a second subpixel 24G for emitting green (second luminescent color) light, and a third subpixel 24B for emitting blue (third luminescent color) light. Each of the plurality of diode connection protection circuits 15R corresponds to the first subpixel 24R that emits red light. Each of the plurality of diode connection protection circuits 15G corresponds to the second subpixel 24G that emits green light. Each of the plurality of diode connection protection circuits 15B corresponds to the third subpixel 24B that emits blue light. The plurality of diode connection protection circuits 15R are arranged in the first row of the staggered arrangement, the plurality of diode connection protection circuit 15G are arranged in the second row of the staggered arrangement, and the plurality of diode connection protection circuits 15B are arranged in the third row of the staggered arrangement.

A high power source line 25 (first high power source line) connected to a high power source is disposed along the X direction between the plurality of diode connection protection circuits 15R in the first row of the staggered arrangement and the plurality of diode connection protection circuit 15G in the second row of the staggered arrangement. A low power source line 26 (first low power source line) connected to a low power source is disposed along the X direction on the side of the plurality of diode connection protection circuits 15R opposite to the plurality of diode connection protection circuits 15G. A low power source line 30 (second low power source line) connected to the low power source is disposed along the X direction on the side of the plurality of diode connection protection circuits 15G opposite to the plurality of diode connection protection circuits 15R. A high power source line 29 (second high power source line) connected to the high power source is disposed along the X direction on the side of the plurality of diode connection protection circuits 15B opposite to the plurality of diode connection protection circuits 15G. Thus, common low power source and common high power source can be realized.

The plurality of diode connection protection circuits 15R, 15G, and 15B are each disposed at a position covered by the semiconductor chip 2.

The video protection circuit 3 protects the plurality of pixels disposed in the display region 7 from static electricity entering through the plurality of panel terminals 14R, 14G, and 14B before the semiconductor chip 2 is mounted. The video protection circuit 3 is disposed only for the purpose of releasing the entered static electricity. Thus, there is no wiring line extending from each of the plurality of panel terminals 14R, 14G, and 14B through a respective one of the plurality of diode connection protection circuits 15R, 15G, and 15B, and returning to be connected to a respective one of the plurality of pixels in the display region 7.

Each of the plurality of diode connection protection circuits 15R includes a pair of diode connected protection transistors 23 (peripheral circuit elements, first elements). Each of the plurality of diode connection protection circuits 15G includes a pair of diode connected protection transistors 23 (peripheral circuit elements, second elements). Each of the plurality of diode connection protection circuits 15B includes a pair of diode connected protection transistors 23 (peripheral circuit elements, third elements).

The low power source line 26 is connected to one of the pair of the protection transistors 23 of each of the plurality of diode connection protection circuits 15R. Further, the high power source line 25 is connected to the other of the pair of the protection transistors 23 of each of the plurality of diode connection protection circuits 15R and one of the pair of the protection transistors 23 of each of the plurality of diode connection protection circuits 15G. Further, the low power source line 30 is connected to the other of the pair of the protection transistors 23 of each of the plurality of diode connection protection circuits 15G and one of the pair of the protection transistors 23 of each of the plurality of diode connection protection circuits 15B. Further, the high power source line 29 is connected to the other of the pair of the protection transistors 23 of each of the plurality of diode connection protection circuits 15B.

As described above, the plurality of diode connection protection circuits 15R, 15G, are 15B are arranged in three stages in accordance with the staggered arrangement so as to correspond to the plurality of panel terminals 14R, 14G, and 14B, respectively, and are wired and connected to the plurality of panel terminals 14R, 14G, and 14B, respectively, and thus there is no diode connection protection circuit having an extremely close wiring distance from a respective one of the plurality of panel terminals. Thus, distances between the plurality of diode connection protection circuits 15R, 15G, and 15B and the plurality of panel terminals 14R, 14G, and 14B, respectively, come uniformly close.

In a case where the plurality of diode connection protection circuits 15R, 15G, and 15B are disposed not in the staggered arrangement but in a linear arrangement such that the protection transistor 23 is in an extremely close distance to the plurality of panel terminals 14R, 14G, and 14B disposed in the staggered arrangement, when static electricity enters from the plurality of panel terminals 14R, 14G, and 14B, a resistance to the protection transistor 23 becomes small, which is not preferable.

Figure 6:
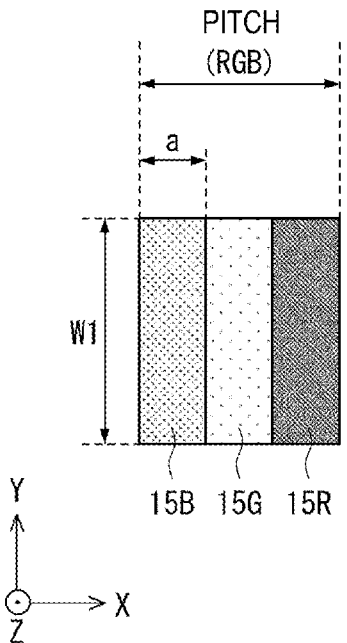
FIG. 6 is a schematic view of a diode connection protection circuit according to a comparative example.
Figure 7:
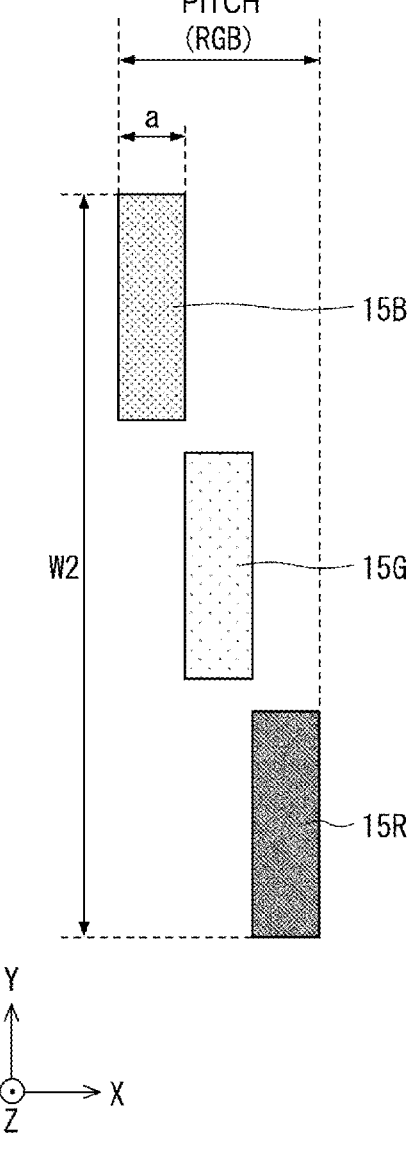
FIG. 7 is a schematic view of a diode connection protection circuit according to the first embodiment.
Figure 8:
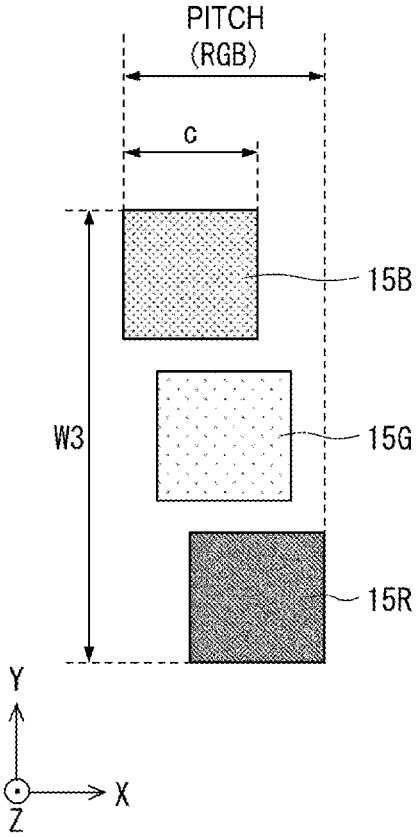
FIG. 8 is a schematic view of a diode connection protection circuit according to a modified example.

FIG. 6 is a schematic view of diode connection protection circuits 15R, 15G, and 15B according to a comparative example. FIG. 7 is a schematic view of diode connection protection circuits 15R, 15G, and 15B according to the first embodiment. FIG. 8 is a schematic view of the diode connection protection circuits 15R, 15G, and 15B according to a modified example.

When the comparative example illustrated in FIG. 6 in which each of the plurality of diode connection protection circuits 15R, 15G, and 15B each having a dimension a in the X direction are arranged along the X direction is arranged is configured to be in the staggered arrangement as illustrated in FIG. 7, a circuit width W2 is larger than a circuit width W1. Thus, as illustrated in FIG. 8, when a dimension c of each of the plurality of diode connection protection circuits 15R, 15G, and 15B in the X direction is made larger than the dimension a in the X-direction, a circuit width W3 is wider than the circuit width W1 but can be narrower than the circuit width W2.

By making the protection transistors 23 in each of the plurality of diode connection protection circuits 15R, 15G, and 15B be in a three-stage staggered arrangement similar to each of the plurality of panel terminals 14R, 14G, and 14B of the output terminal portion 13, the distances from all the plurality of panel terminals 14R, 14G, and 14B to the protection transistors 23 come uniformly close. Thus, protection resistances defined by the above-described distances also come uniformly close, and withstand voltages of the protection transistors 23 when static electricity enters from the plurality of panel terminals 14R, 14G, and 14B also become substantially constant. When there is a protection transistor 23 whose distance from a respective one of the plurality of panel terminals 14R, 14G, and 14B is short, the protection resistance corresponding to the protection transistor 23 becomes small, and the panel terminals 14R, 14G, and 14B corresponding to the protection transistor 23 become terminals that are weak against the entrance of static electricity.

Second Embodiment

Figure 9:
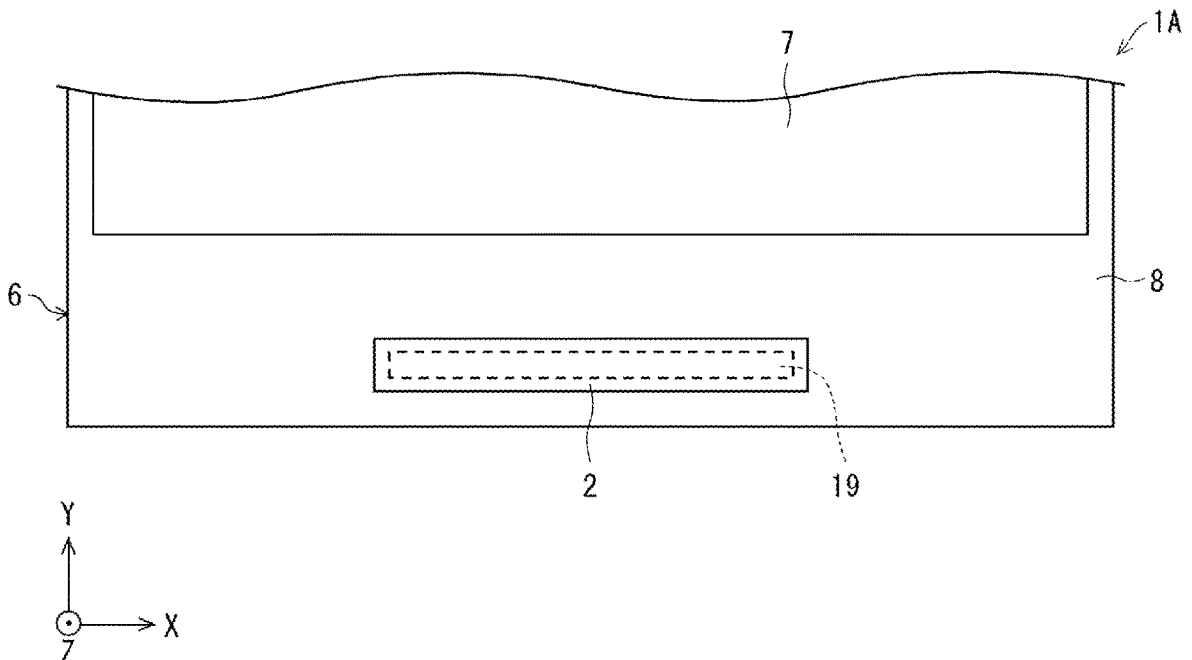
FIG. 9 is a plan view of a main part of a display device according to a second embodiment.
Figure 10:
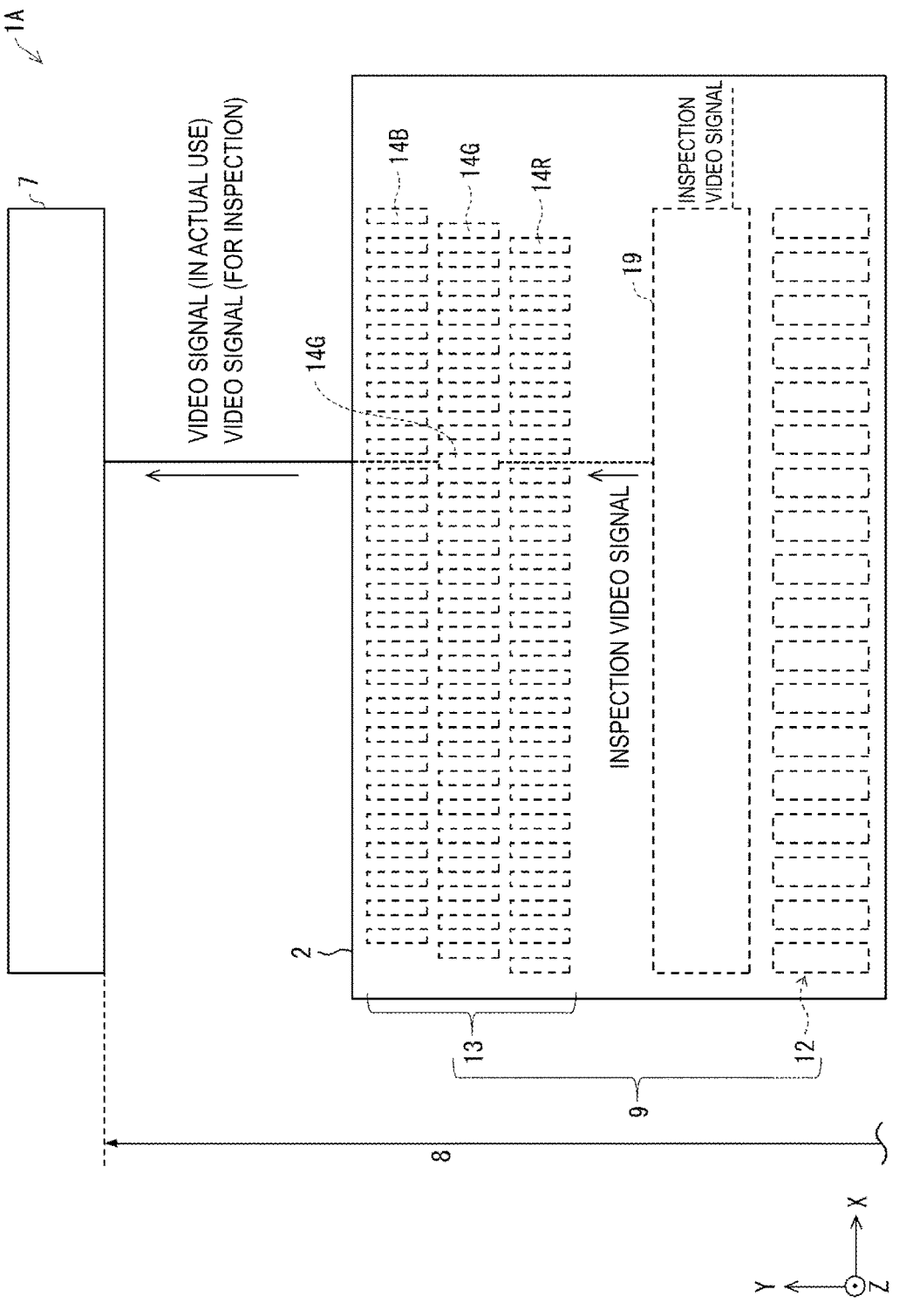
FIG. 10 is a schematic view illustrating an arrangement relationship among pixels, a panel terminal portion, and a panel inspection circuit provided in the display device.
Figure 11:
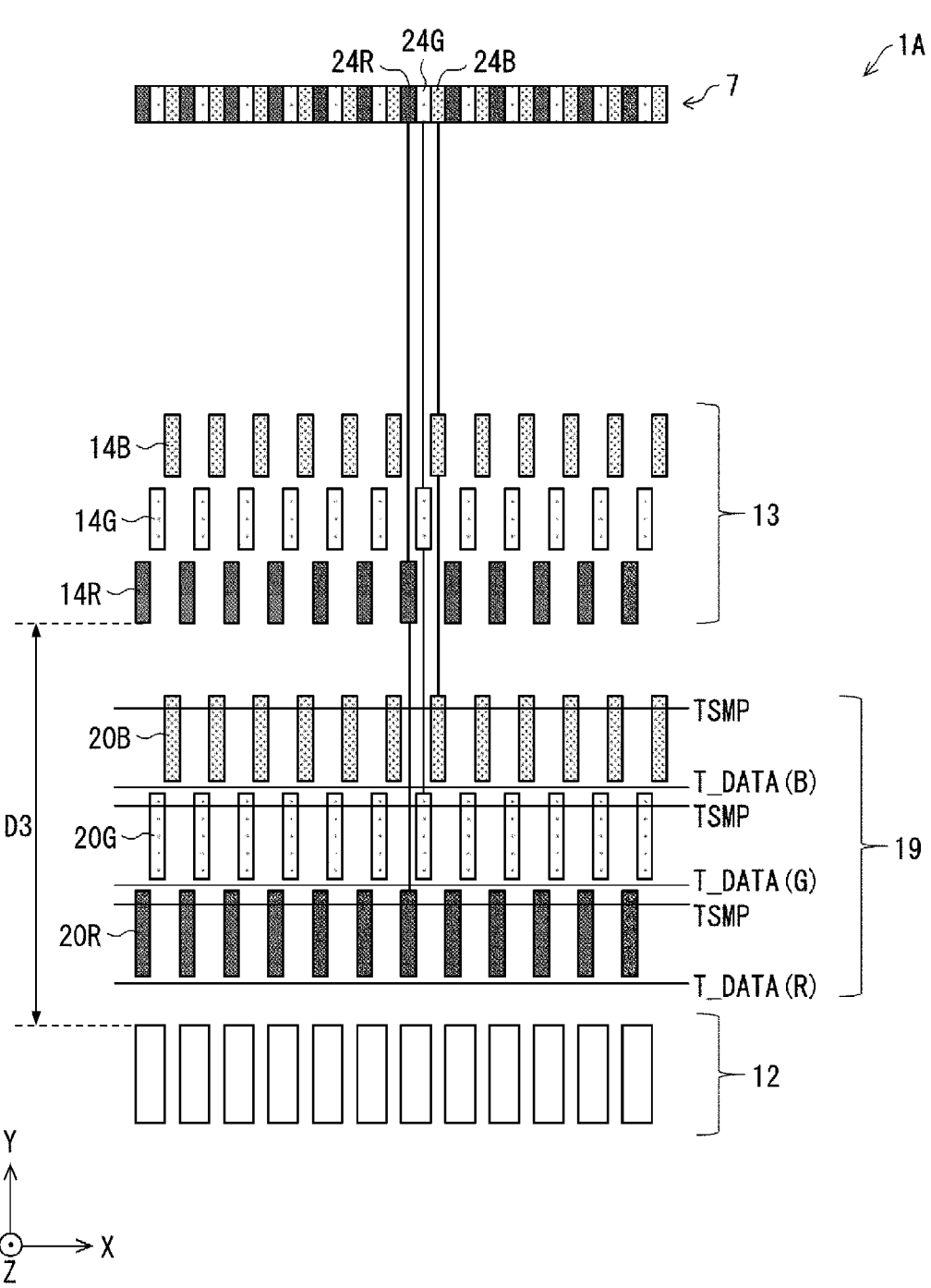
FIG. 11 is a schematic view illustrating a configuration of a luminescent color inspection circuit provided in the panel inspection circuit.
Figure 12:
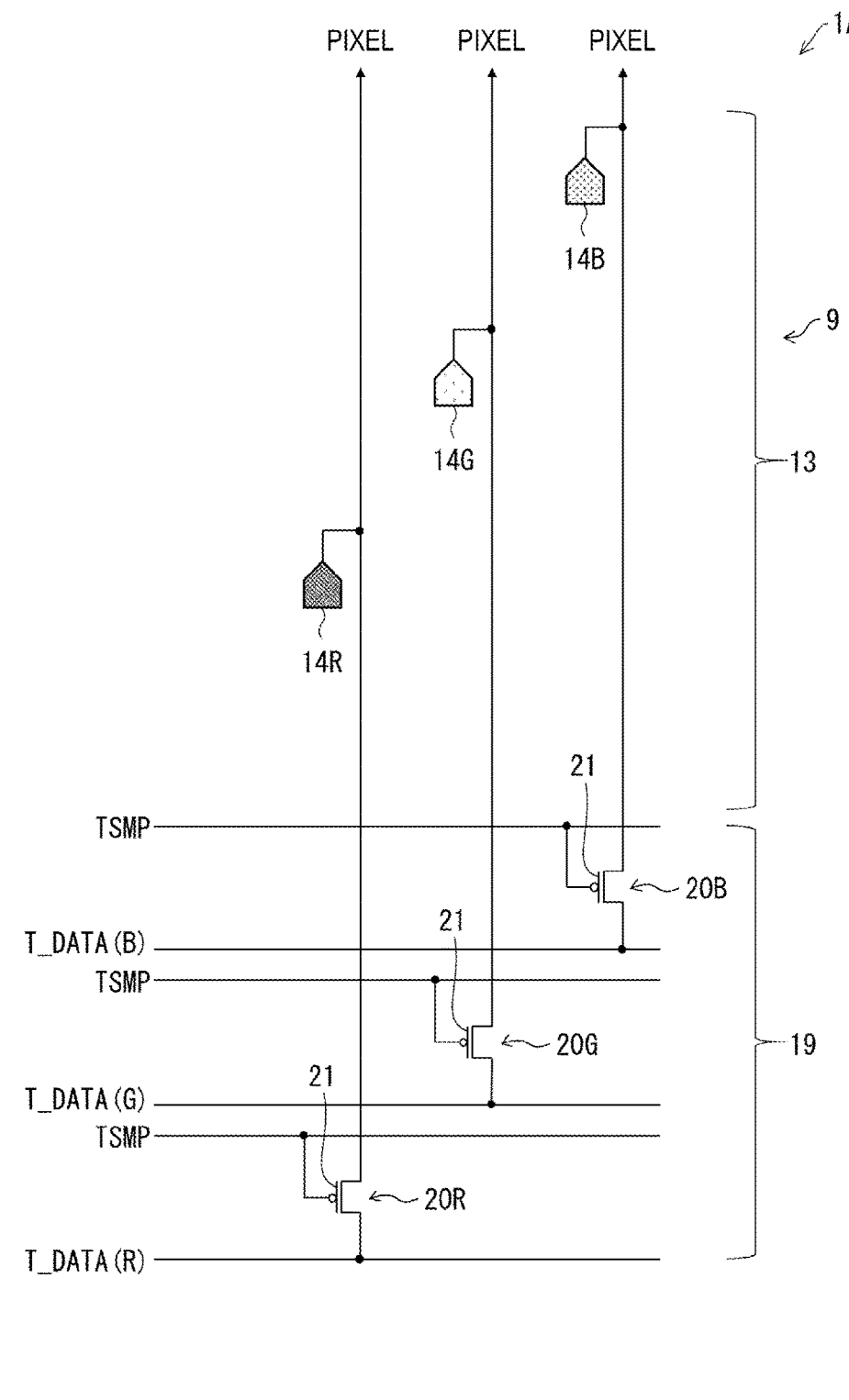
FIG. 12 is a schematic view illustrating an arrangement relationship between the panel terminal portion and the luminescent color inspection circuit.

FIG. 9 is a plan view of a main part of a display device 1A according to a second embodiment. FIG. 10 is a schematic view illustrating an arrangement relationship among pixels, a panel terminal portion 9, and a panel inspection circuit 19 provided in the display device 1A. FIG. 11 is a schematic view illustrating a configuration of luminescent color inspection circuits 20R, 20G and 20B provided in the panel inspection circuit 19. FIG. 12 is a schematic view illustrating an arrangement relationship between the panel terminal portion 9 and the luminescent color inspection circuits 20R, 20G and 20B. Constituent elements similar to the constituent elements described above are given the same reference numerals, and detailed descriptions thereof are not repeated.

The display device 1A includes the semiconductor chip 2 mounted in the frame region 8 disposed around the display region 7, and the panel inspection circuit 19 (peripheral circuit) formed in the frame region 8 in order to inspect the plurality of pixels in the display region 7 before the semiconductor chip 2 is mounted in the frame region 8.

The display panel 6 includes the panel terminal portion 9. The panel terminal portion 9 includes the input terminal portion 12 and the output terminal portion 13. The output terminal portion 13 includes the plurality of panel terminals 14R, 14G, and 14B to which the plurality of output terminals 28 of the semiconductor chip 2 are bonded.

As illustrated in FIGS. 10 and 11, the plurality of panel terminals 14R are arranged along the X direction, the plurality of panel terminals 14G are arranged along the X direction, and the plurality of panel terminals 14B are arranged along the X direction. The plurality of panel terminals 14R, 14G, and 14B are arranged in three stages in accordance with the staggered arrangement in which the plurality of panel terminals are arranged in directions oblique to each other.

The panel inspection circuit 19 includes a plurality of first luminescent color inspection circuits 20R, second luminescent color inspection circuits 20G, and third luminescent color inspection circuits 20B (panel inspection circuits, peripheral circuits) arranged in accordance with the staggered arrangement so as to correspond to the plurality of panel terminals 14R, 14G, and 14B, respectively.

The plurality of first luminescent color inspection circuits 20R, second luminescent color inspection circuits 20G, and third luminescent color inspection circuits 20B are each disposed at a position covered by the semiconductor chip 2.

The panel inspection circuit 19 supplies, to the pixel and the pixel circuit for controlling the pixel, a signal for inspecting an operation of a respective one of the plurality of pixels in the display region 7 before the semiconductor chip 2 is mounted.

Each of the plurality of first luminescent color inspection circuits 20R, second luminescent color inspection circuits 20G, and third luminescent color inspection circuits 20B includes an inspection transistor 21 (a peripheral circuit element, a first element, a second element, or a third element) provided to supply a signal for inspecting the operation of a respective one of the plurality of the pixel to the pixel.

Each of the plurality of pixels disposed in the display region 7 includes the first subpixel 24R for emitting red (first luminescent color) light, the second subpixel 24G for emitting green (second luminescent color) light, and the third subpixel 24B for emitting blue (third luminescent color) light. Each of the plurality of first luminescent color inspection circuits 20R corresponds to the first subpixel 24R that emits red light. Each of the plurality of second luminescent color inspection circuits 20G corresponds to the second subpixel 24G that emits green light. Each of the plurality of third luminescent color inspection circuits 20B corresponds to the third subpixel 24B that emits blue light. The plurality of third luminescent color inspection circuits 20B are arranged in the first row of the staggered arrangement, the plurality of second luminescent color inspection circuit 20G are arranged in the second row of the staggered arrangement, and the plurality of first luminescent color inspection circuits 20R are arranged in the third row of the staggered arrangement.

In order to narrow the frame region 8 of the display panel 6, when the panel inspection circuit is disposed under the semiconductor chip 2, by making the plurality of first luminescent color inspection circuits 20R, second luminescent color inspection circuits 20G, and third luminescent color inspection circuits 20B of the panel inspection circuit 19 be in the three-stage staggered arrangement similar to the plurality of panel terminals 14R, 14G, and 14B, the inspection transistor 21 can be prevented from being extremely close to the plurality of panel terminals 14R, 14G, and 14B.

Each of the plurality of first luminescent color inspection circuits 20R, second luminescent color inspection circuits 20G, and third luminescent color inspection circuits 20B of the panel inspection circuit 19 supplies an inspection video signal to a respective one of subpixels through a respective one of the plurality of panel terminals 14R, 14G, and 14B before the semiconductor chip 2 is mounted. In actual use after the semiconductor chip 2 is mounted, the video signal is output from each of the plurality of panel terminals 14R, 14G, and 14B to a respective one of the subpixels in the display region 7. Thus, there is no wiring line extending from the plurality of panel terminals 14R, 14G, and 14B through a respective one of the plurality of the first luminescent color inspection circuits 20R, the second luminescent color inspection circuits 20G, and the third luminescent color inspection circuits 20B and returning to be connected to the respective one of the subpixels.

By making the inspection transistors 21 in a respective one of the plurality of first luminescent color inspection circuits 20R, second luminescent color inspection circuits 20G, and third luminescent color inspection circuits 20B of the panel inspection circuit 19 be in the three-stage staggered arrangement similar to the plurality of panel terminals 14R, 14G, and 14B of the output terminal portion 13, the distances from all the plurality of panel terminals 14R, 14G, and 14B to the inspection transistors 21 come uniformly close. Thus, protection resistances defined by the above-described distances also come uniformly close, and withstand voltages of the inspection transistors 21 when static electricity enters from the plurality of panel terminals 14R, 14G, and 14B also become substantially constant. When there is an inspection transistor 21 having a short distance from the plurality of panel terminals 14R, 14G, and 14B, the inspection transistor 21 has the lowest withstand voltage when static electricity enters from the plurality of panel terminals 14R, 14G, and 14B, which is not preferable.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. A display device comprising:

a semiconductor chip, mounted in a frame region disposed around a display region of a display panel, to supply a video signal to a plurality of pixels disposed in the display region of the display panel;

a peripheral circuit formed in the frame region to protect or inspect the plurality of pixels in the display region before the semiconductor chip is mounted in the frame region;

a first high power source line and a second high power source line; and a first low power source line and a second low power source line, each having a potential lower than a potential of a respective one of the first high power source line and the second high power source line, wherein the display panel includes a plurality of panel terminals to which a plurality of output terminals of the semiconductor chip is bonded, respectively, the plurality of panel terminals is arranged in accordance with a staggered arrangement in which the plurality of panel terminals is arranged in directions oblique to each other, the peripheral circuit includes a plurality of peripheral circuit elements arranged in accordance with the staggered arrangement to correspond to the plurality of panel terminals, respectively, each of the plurality of pixels includes a first subpixel configured to emit a first luminescent color light, a second subpixel configured to emit a second luminescent color light, and a third subpixel configured to emit a third luminescent color light, some of the plurality of peripheral circuit elements are a plurality of first elements corresponding to the first subpixel, another some of the plurality of peripheral circuit elements are a plurality of second elements corresponding to the second subpixel, still another some of the plurality of peripheral circuit elements are a plurality of third elements corresponding to the third subpixel, the plurality of first elements is arranged in a first row of the staggered arrangement, the plurality of second elements is arranged in a second row of the staggered arrangement, the plurality of third elements is arranged in a third row of the staggered arrangement, the first low power source line, the first row of the staggered arrangement, the first high power source line, the second row of the staggered arrangement, the second low power source line, the third row of the staggered arrangement, and the second high power source line are arranged in this order, the first low power source line is connected to the plurality of first elements, the first high power source line is connected to the plurality of first elements and the plurality of second elements, the second low power source line is connected to the plurality of second elements and the plurality of third elements, and the second high power source line is connected to the plurality of third elements.

2. The display device according to claim 1, wherein each of the plurality of peripheral circuit elements is disposed at a position covered by the semiconductor chip.

3. The display device according to claim 1, wherein the peripheral circuit further includes a video protection circuit configured to protect the plurality of pixels from static electricity entering through the plurality of panel terminals.

4. The display device according to claim 3, wherein each of the plurality of peripheral circuit elements includes a protection transistor provided in the video protection circuit.

5. The display device according to claim 1, wherein the peripheral circuit further includes a panel inspection circuit configured to supply, to the plurality of pixels, a signal for inspecting operations of the plurality of pixels before the semiconductor chip is mounted.

6. The display device according to claim 5, wherein each of the plurality of peripheral circuit elements includes an inspection transistor provided in the panel inspection circuit.

* * * * *